Figure 1:
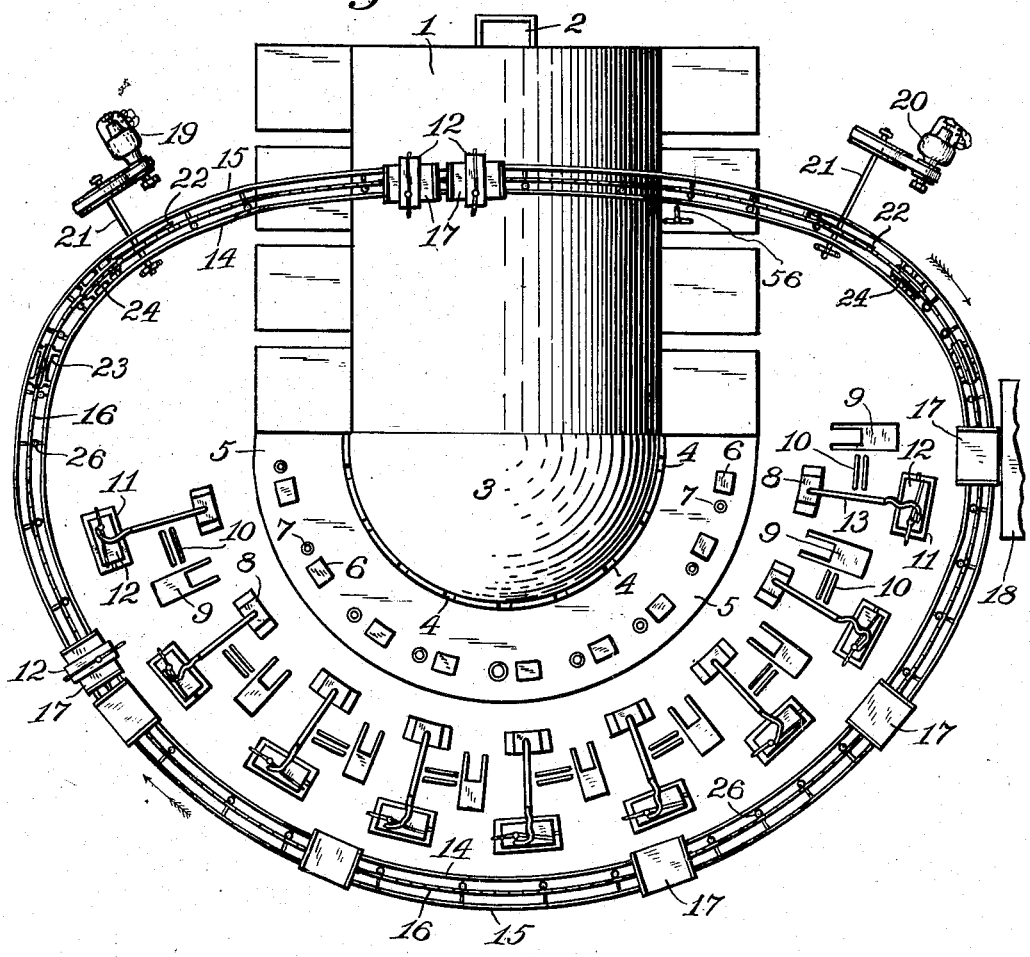

W. E. HOLMES.
METHOD AND APPARATUS FOR MAKING GLASSWARE.
APPLICATION FILED APR. 22, 1907.

900,281.

Patented Oct. 6, 1908.
6 SHEETS—SHEET 1.

WITNESSES:
J. H. Gardner.
M. D. Beaty.

INVENTOR:
William E. Holmes,
BY
E. T. Silvius.
ATTORNEY.

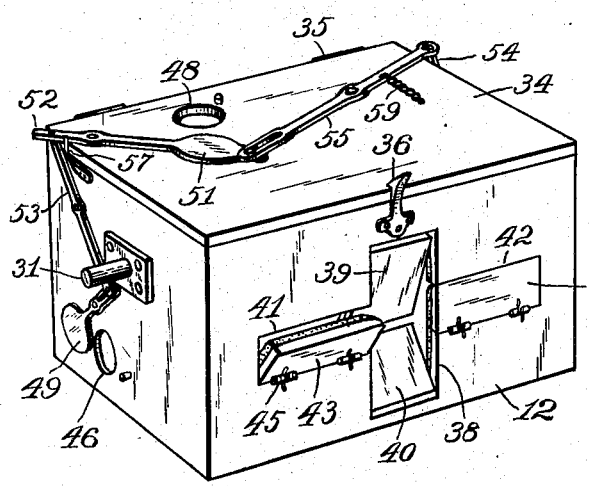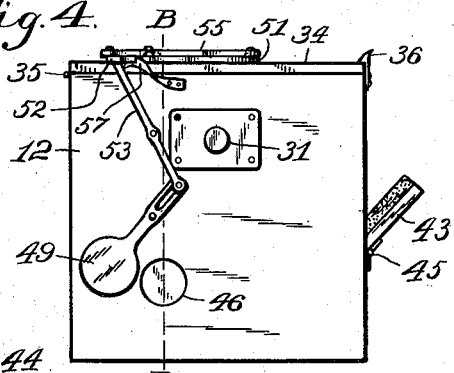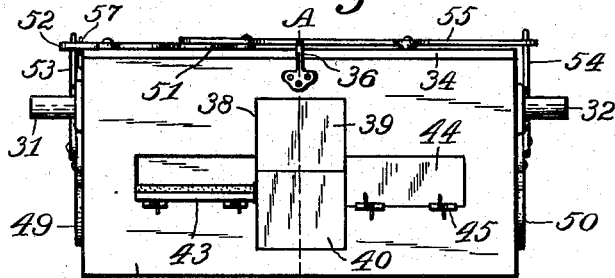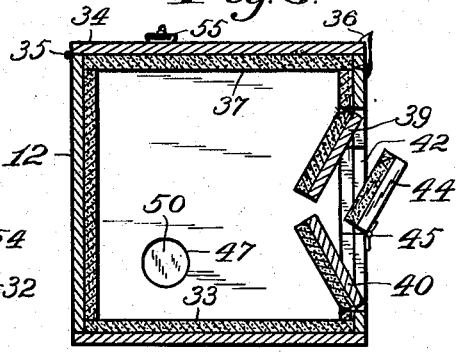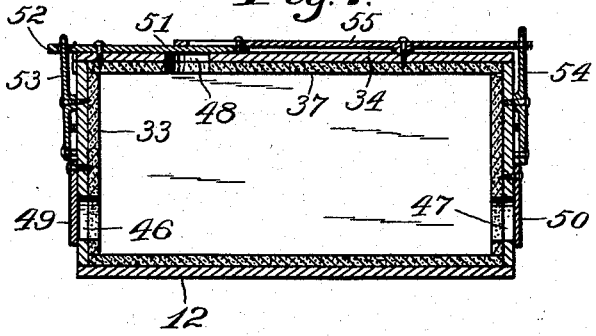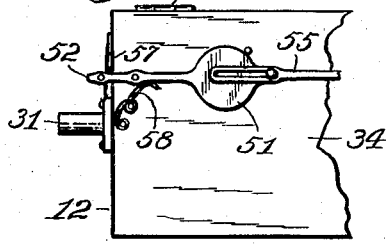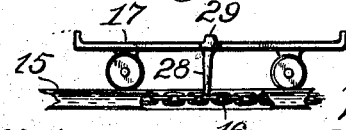

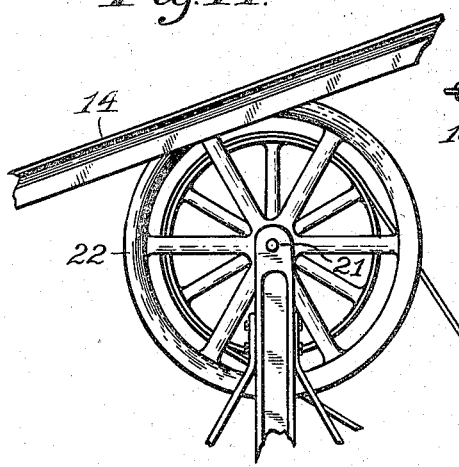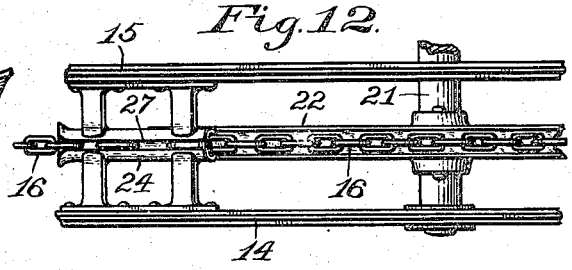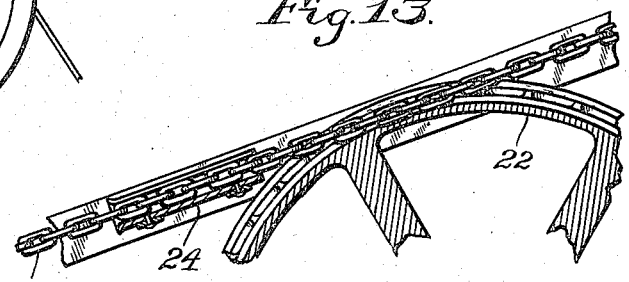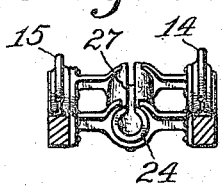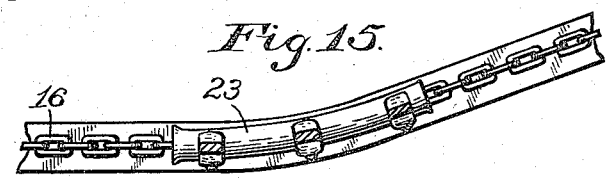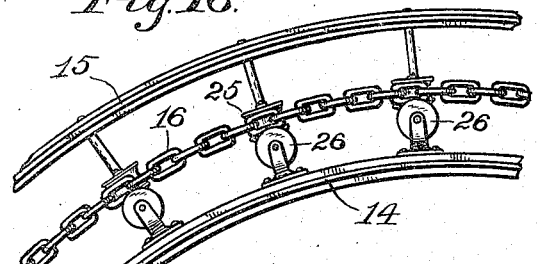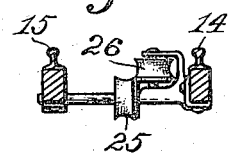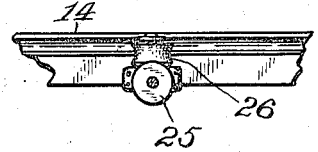

W. E. HOLMES.
METHOD AND APPARATUS FOR MAKING GLASSWARE.
APPLICATION FILED APR. 22, 1907.
900,281.
Patented Oct. 6, 1908.
6 SHEETS—SHEET 5.
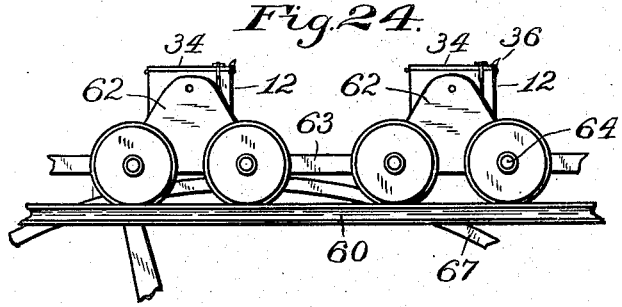
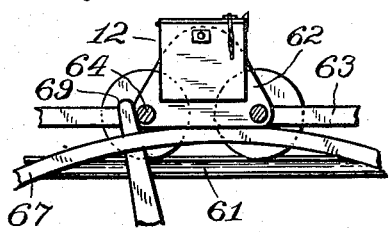
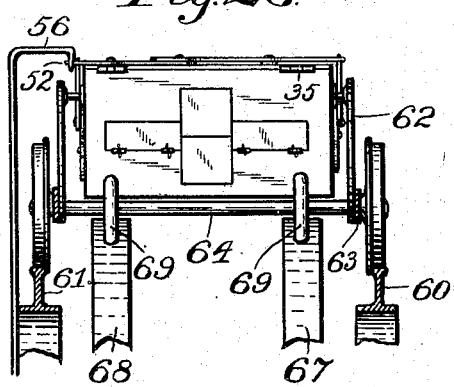
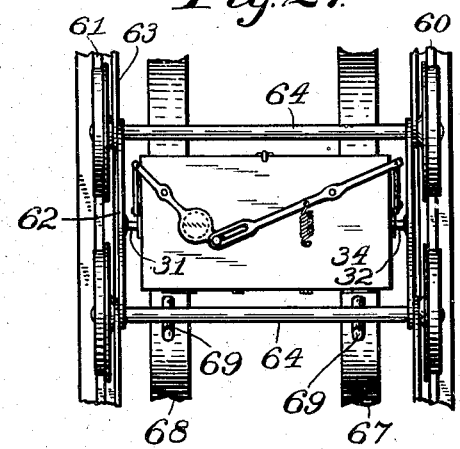
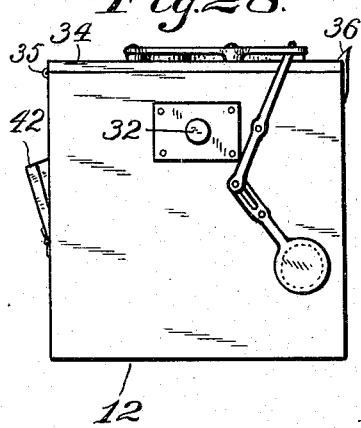
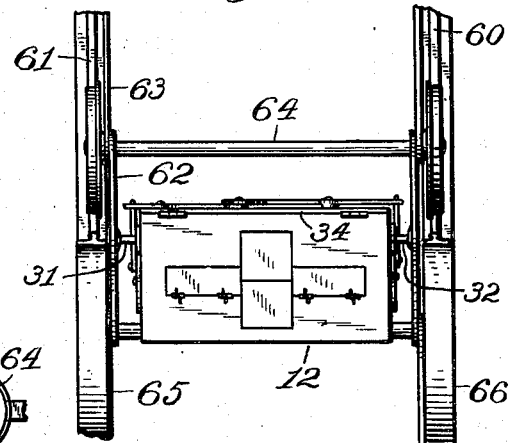
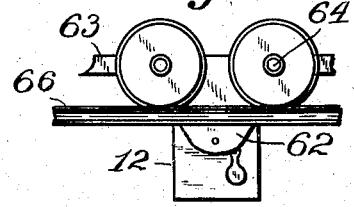
WITNESSES:
J. H. Gardner.
M. D. Beaty.
INVENTOR:
William E. Holmes,
BY
E. T. Silvius,
ATTORNEY.

UNITED STATES PATENT OFFICE.

WILLIAM E. HOLMES, OF CICERO, INDIANA.

METHOD AND APPARATUS FOR MAKING GLASSWARE.

No. 900,281.        Specification of Letters Patent.        Patented Oct. 6, 1908.

Application filed April 22, 1907. Serial No. 369,519.

*To all whom it may concern:*

Be it known that I, WILLIAM E. HOLMES, a citizen of the United States, residing at Cicero, in the county of Hamilton and State of Indiana, have invented certain new and useful Improvements in Methods and Apparatus for Making Glassware; and I do declare the following to be a full, clear, and exact description of the invention, reference being had to the accompanying drawings, and to the letters and figures of reference marked thereon, which form a part of this specification.

This invention relates to the manufacture of glassware such as bottles and the like, the invention having reference particularly to the final operations required to complete the articles, which operations comprise the annealing of the articles or rendering them less brittle than would be the case if allowed to cool rapidly after having been formed.

The objects of the invention are to carry out the annealing operations by a new and improved method and apparatus whereby the expense consequent upon placing the formed articles in the separate annealing oven commonly used may be avoided, to provide portable annealing ovens in which the articles may be annealed while being conveyed from the finisher to the packer or warehouse, thus avoiding the expense of repeated handling of the articles, a still further object being to avoid the cost of fuel for annealing purposes by utilizing the heat of the glassware in the portable annealing ovens.

The invention consists in a method of handling heated glassware as it leaves the finisher's hands whereby the glassware is utilized to heat portable ovens adapted to be used as conveyers to a warehouse or shipping or packing station, the heat transferred to the ovens being utilized for annealing the articles, the invention consists further in apparatus for carrying out the above-described method; and the invention consists further in the parts and combinations and arrangements of parts as hereinafter particularly described and claimed.

In carrying out the objects of the invention the apparatus may be variously constructed so that the glassware may be delivered in an annealed condition, either close to where it may be made or to more distant points either on the ground level or higher or lower than the ground level, and in illustrating the apparatus several plans are shown.

Figure 2:
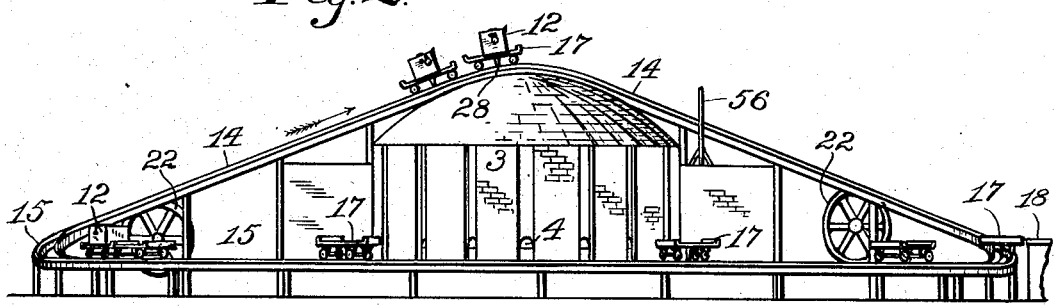
Figure 21:
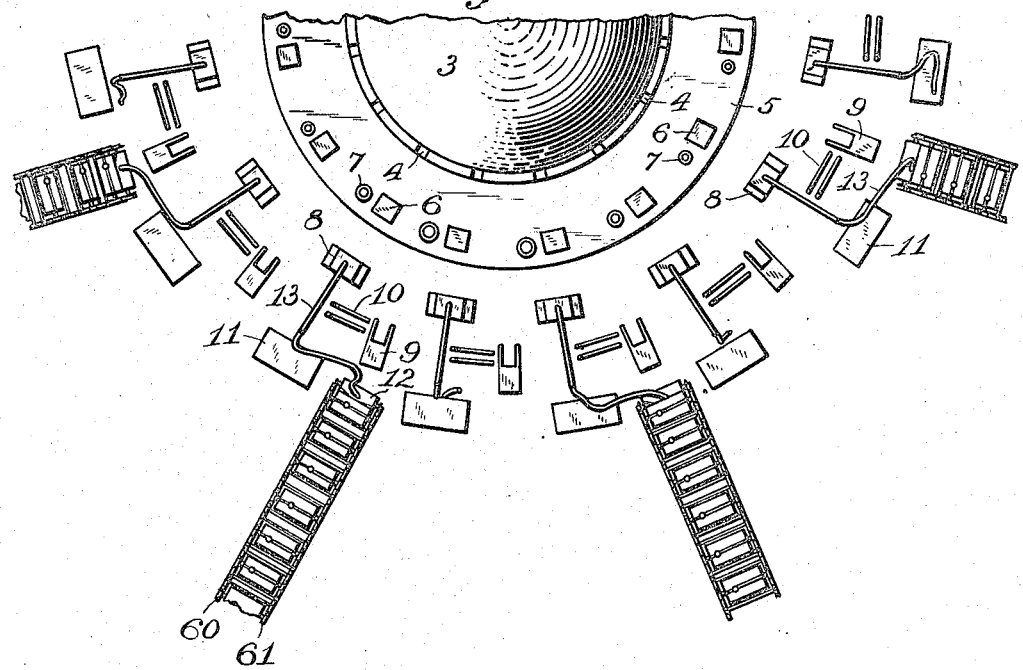
Figure 22:
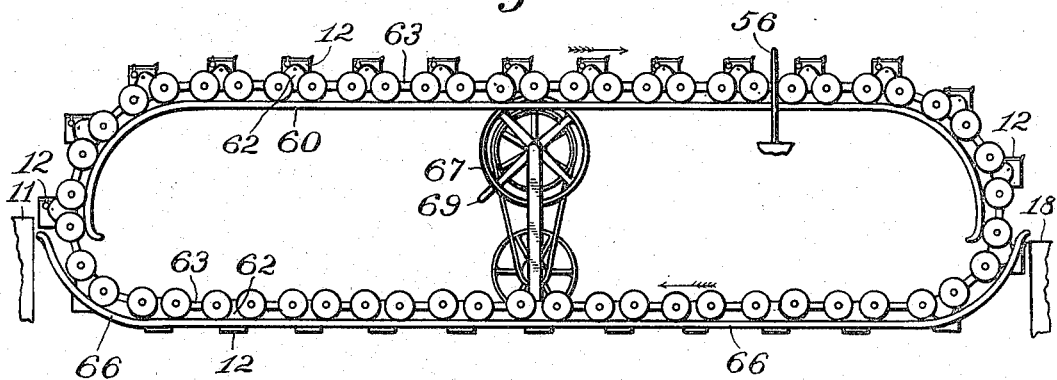
Figure 23:
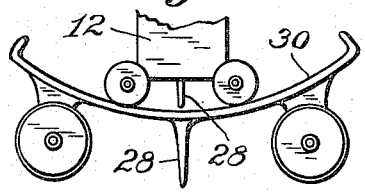
Figure 31:
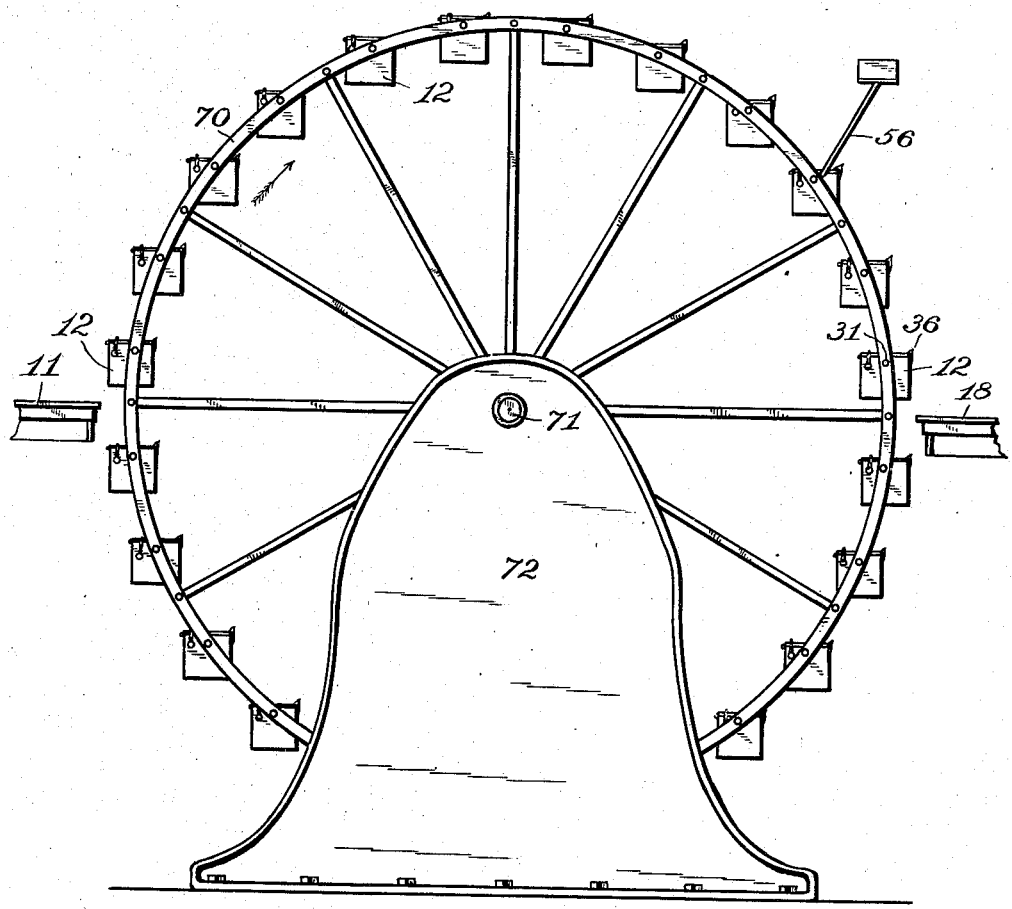

Referring to the drawings Figure 1 is a top plan view illustrating the arrangement of the apparatus with respect to glassworks when only a limited amount of ground space is available for carrying out the invention; Fig. 2, a front elevation thereof; Fig. 3, a perspective view of one of the portable annealing ovens of which any suitable number may be employed; Fig. 4, an end elevation of the oven; Fig. 5, a front elevation of the oven; Fig. 6, a transverse sectional view on the line A A in Fig. 5; Fig. 7, a vertical sectional view approximately on the line B B in Fig. 4; Fig. 8, a fragmentary top plan view of the oven; Fig. 9, a side view of one of the cars shown in Figs. 1 and 2 for conveying the ovens; Fig. 10, an end elevation of the car; Fig. 11, a fragmentary side elevation showing a drive wheel for operating the cars on track rails; Fig. 12, a fragmentary top plan of the track and conveyer chain; Fig. 13, a fragmentary sectional view showing the drive wheel and the chain in connection therewith; Fig. 14, a perspective view of a guide for the chain; Fig. 15, a side elevation of a curved chain guide; Fig. 16, a fragmentary plan view of the track when constructed with a curvature; Fig. 17, a transverse sectional view of the track showing guide rollers for the chain; Fig. 18, a fragmentary sectional elevation showing the guide rollers; Fig. 19, a top plan view of the drive wheel; Fig. 20, a fragmentary sectional view of the drive wheel; Fig. 21, a fragmentary plan view showing the arrangement of conveyer radiating from the glass works, which plan may be used where the delivering point is located at some distance away on large grounds, either above or below the ground level or where different kinds of wares may be delivered to different points; Fig. 22, a side elevation illustrating the type of conveyer shown in Fig. 21; Fig. 23, a side elevation of a car adapted to form part of the apparatus shown in Figs. 1 and 2 when it is desired to maintain the ovens in horizontal position at all times on inclined portions of the track, the top of the car being curved and the ovens being provided with wheels so as to roll upon the car by force of gravity; Fig. 24, a fragmentary side elevation showing cars on which the ovens are permanently pivoted; Fig. 25, a fragmentary sectional view showing a fragment of the drive wheel in connection with one of the cars; Fig. 26, a fragmentary sectional elevation showing the car on which the oven is pivoted; Fig. 27, a fragmentary top plan of the oven and the car on which it is pivoted; Fig. 28, an end elevation of the oven slightly modified as to the arrangement of the heat regulators thereof; Fig. 29, a fragmentary sectional elevation showing one of the pivoted ovens in position to be filled as arranged in Fig. 22; Fig. 30, a fragmentary side elevation showing one of the cars inverted as when returning with an empty oven pivoted thereto; Fig. 31, a side elevation of a conveyer constructed as a wheel on which the ovens are pivoted; so as to hang upright at all times; and Fig. 32 a top plan of the wheel and ovens thereon.

Similar reference numerals throughout the drawings in the various figures thereof designate corresponding elements or features of the invention.

In the drawings 1 designates a furnace in which the molten glass is produced, the sand and other substances required being fed into the hopper 2, and 3 designates the reservoir from which the molten glass is to be taken as required by the blowers from openings 4 in the front wall thereof, all of which may be of the usual construction, the blowers standing upon a platform 5 on which are tables or plates 6 and molds 7, all of well known construction and arrangement, as are also reheating furnaces or " glory holes " 8, work benches 9 for the men who finish the necks of the bottles or similar articles, and the bucks 10 on which the finished ware is to be placed by the finishers.

Heretofore an annealing oven has been employed at considerable expense and the bottles have been carried manually from the bucks to the annealing furnace. The glassware is reheated in the annealing furnace, having become cooled while being carried thereto, and is then permitted to cool slowly in its passage by stages through the annealing furnace on a conveyer. By the use of the present invention the constant daily expense of carriers is saved as is also the fuel heretofore required for heating the annealing oven. Usually tables 11 are provided near the shops for supporting the portable ovens 12 temporarily while being filled with the glassware. It is designed that waste heat from the reheating furnace 8 may be conveyed through pipes 13 to the ovens while they may be filled. This provision however, might be dispensed with in summer seasons. A suitable track comprising rails 14 and 15 is constructed and may be substantially circular in plan or arranged otherwise so as to be continuous. If ground space is limited the track may extend upon and over the furnace 1, as shown in Figs. 1 and 2, and the track is provided with an endless conveyer chain 16 arranged between the two rails and suitably supported and guided. A suitable number of cars 17 are mounted on the track, there being preferably a sufficient number of cars to cover the whole track so that the cars will be close together. A delivery station 18 is arranged at a suitable point near the track, and this may be a warehouse or packing station at which the glassware is to be received, annealed and sufficiently cooled to be handled. Two electric motors 19 and 20 are arranged at suitable points or other means for applying power to the conveyer chain may be provided, each motor or engine having a drive shaft 21 on which is mounted a drive wheel 22 engaging the chain 16. Suitable guides 23 and 24 may be provided where the track has inclinations, the guide 24 being usually preferably close to the drive wheel to guard against the chain leaving the wheel. Rollers 25 are mounted on horizontal axes under the chain for its support, and rollers 26 are mounted on vertical axes at the inner side of the chain where the track is curved as lateral guides for the chain. The guides 23 and 24 are of tubular form, each one having a slot 27 in its top to clear an arm 28 with which the body of each car 17 is provided, each arm engaging a link of the chain 16 whereby the cars are propelled. The chain may be actuated either continuously at a low rate of speed or may be actuated intermittently, advancing a short distance at each movement. The ovens after having been filled with the glassware may be transferred from the tables 11 to the cars 17 and may be gaged thereon by placing them against a gage 29 on one side of each car. In some cases the ovens as shown in Fig. 23 may be provided with wheels and mounted on a car 30 having a curved top. If the track be level, the ovens, themselves provided with wheels and the arm 28, may be mounted directly on the track and suitably coupled together and driven by any suitable means, such as will be hereinafter described, without requiring a chain and the arms 28.

The portable ovens which are essential to the successful carrying out of the invention, are adapted to be heated and to retain heat with gradually lowering degree of temperature in their passage from the points at which the glassware is placed in the ovens to the delivery point, and the heat may be supplied either wholly or in greater part by the heated glassware as it leaves the finisher's bench. Each oven is made of any convenient shape, being preferably rectangular and oblong as a chest, having a bottom, sides and ends, the ends being provided with a pair of trunnions 31 and 32 which, however, may in some cases be dispensed with. The walls of the oven are relatively thick and have suitable lining 33 adapted to retard radiation of heat from the oven. A lid 34 is connected by hinges 35 to one side of the oven and is provided with a latch 36 for holding the lid in closed position, the lid having a lining 37. The linings 33 and 37 may be composed of any suitable material, as asbestos, and of any suitable number of layers. In the middle of the front of the oven is a relatively high opening 38 normally closed by two doors 39 and 40 both swinging inwardly, one, being hinged at the top of the opening and the other one at the bottom of the opening, the doors also having suitable linings. Two other narrow openings 41 and 42 extend from the opening 38 towards opposite ends of the oven, these being normally closed by doors 43 and 44 mounted on spring hinges 45 and suitably lined on their inner sides. The doors 43 and 44 open outwardly. In the ends of the oven are regulator openings 46 and 47, the lid 34 being provided with a regulator opening 48, and when desired the pipe 13 may be connected with the opening 48 for conveying heat to the oven. Gates 49, 50 and 51 are provided for the openings respectively, the gates being pivotally mounted adjacent to the openings. The gate 51 has an arm 52 whereby all of the gates may be operated to open them, being closed by means of suitable springs. A lever 53 is pivoted on one end of the oven and is connected to the gate 49 and also to the arm 52. A similar lever 54 is pivoted on the other end of the oven and is connected with a gate 50 and also with a lever 55 that is pivoted on the lid 34 and connected with the gate 51. At a suitable point along the track somewhat near the delivery station 18 a trip arm 56 is suitably supported in the path of the arm 52 so that the gates may be opened to admit air for hastening the final cooling of the ovens and their contents. The gates are held open until arrival at the delivery station by means of a latch 57 that engages the arm 52. Springs 58 or 59 are employed for normally holding the gates so as to close the several openings.

Referring to another arrangement shown particularly in Figs. 21, 22 and Figs. 24 to 29 inclusive, a track comprising rails 60 and 61 may be provided having outwardly-curved ends, a suitable number of the ovens 12 being mounted on the track, in the present instance the ovens being pivoted on cars 62, and the cars are connected together by links 63 which engage the axles 64 of the cars. The cars are to move in one direction on the track, and another track is arranged below and comprises rails 65 and 66 which have upwardly curved ends extending beyond the ends of the rails of the upper track, and the cars which are on the lower track are inverted, the ovens swinging in the frames of the cars and therefore always remain upright in passing from either track to the other one. A suitable drive wheel is provided or preferably two drive wheels 67 and 68, each having an arm 69 projecting from its periphery so as to engage an axle of a car for moving the train of cars periodically. If desired of course the drive wheels may be provided with additional arms, but it is proposed to drive the wheels very slowly and to fill one oven and unload another during one revolution of the drive wheels while the ovens remain at rest so that the ovens will be moved intermittently a distance equal to that between either two ovens, and hence the time required to pass from the loading table 11 to the delivery station 18 will be considerable.

Figure 32:
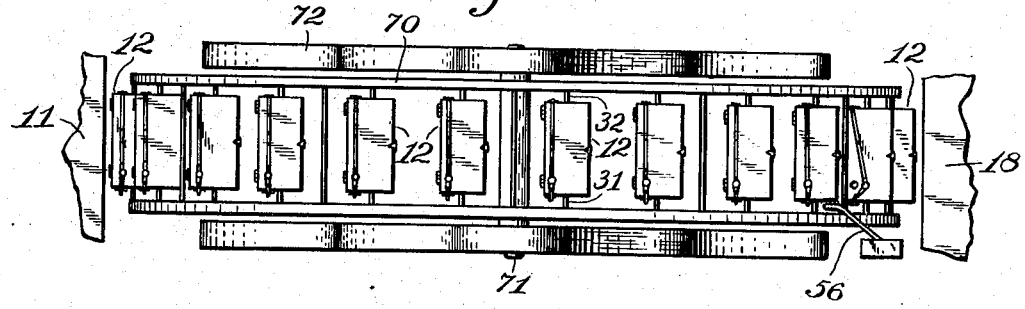

Figs. 31 and 32 illustrate another way in which the ovens may be conveyed from the loading table 11 to the delivery station 18, a relatively large wheel 70 being mounted on an axle 71 supported by a frame 72. The wheel may be rotated intermittently by any suitable motor. The ovens as will be seen are hung by their trunnions in the periphery of the wheel, and since the trunnions are arranged above the center of gravity of each oven they will hang upright at all times.

From the foregoing it will be seen that the only handling required is to place the glassware in the ovens close to the place where they are finally finished with respect to the manual manipulations, and then removed from the ovens at a predetermined place where they may be stored or from which place they may be packed and shipped. As is well known an attendant will take an article such as a bottle from a mold 7 and place the neck in the reheating oven 8, the body of the bottle being very hot and its heat increased considerably in the reheating furnace while the neck is being reheated, then the man on a bench 9 with a proper implement will finish the top of the neck while hot, holding the bottle in suitable tongs which he will then place on the buck 10. An attendant will then remove them as rapidly as possible while still hot and place them by means of tongs into an oven. In doing so he will place the bottle against the doors 39 and 40, pushing the doors inwardly until the bottle is within the oven, then by means of the tongs pressing outwardly, either one of the smaller doors 43 or 44 may be opened sufficiently to move the tongs in the narrow opening more or less towards either end of the oven, when the bottle may be readily placed upon the bottom of the oven and then the tongs may be withdrawn from the oven over the top of the smaller door, the larger doors closing automatically when the bottle has been moved away from them. The regulator gates are to be closed while filling an oven except that the heating pipe may be connected at the opening 48 when desired to slightly raise the temperature of the interior of the oven. If the lid 34 be raised slightly the arm 52 may be disconnected from the lever 53 which extends through a slot in the arm, so that the gate 51 may be manipulated by hand, independently of the other gates. After the glassware is placed in the oven the heat retained by the articles, which at first may be of uneven degree of temperature, will gradually become uniform throughout and envelop all of the articles by reason of the accumulation of heat being retained in the oven and spreading evenly throughout. As the ovens are carried along in their course the temperature therein will fall gradually and thereby avoid rapid cooling of the articles of glassware, and as above stated, when sufficiently cooled for the purpose the glassware may be further cooled for handling by means of the trip arm 56 causing the regulating gates to be opened, so that air may enter the lowermost openings and pass out the opening 48 in the lid of each oven in turn. It being understood that the conveyers are endless or that the ovens may be connected in an endless train, it follows that they will pass along in rotation, slowly accomplishing the annealing process, and then returning to be filled after having been emptied of their contents, to be again refilled repeatedly. The articles are to be removed from the ovens conveniently from the tops thereof after having opened the lids.

Having thus described the invention, what is claimed as new is—

1. The method of annealing articles of glassware after mechanically finishing the same while hot, which method consists in inclosing a plurality of the heated articles without reheating in a substantially tight portable oven and thereby producing an envelop of heat about the articles derived from the heat of the articles, to prevent rapid cooling of the articles, and then conveying the articles and the envelop of heat together in the oven through the natural atmosphere.

2. The method of making glass articles, which method consists in shaping the articles of molten substance, then reheating the articles, then applying a finishing tool to the articles while heated, then inclosing the articles while heated in an oven, then retaining the heat of the articles as an envelop in and about the articles, then conveying the articles and the envelop of heat together in the oven through the natural atmosphere.

3. The method of finishing glass articles, which method consists in heating the articles, then mechanically finishing the articles while heated, then inclosing a plurality of the articles while heated and without reheating in a portable oven and thereby causing an envelop of heat to be created about the articles derived from the heat of the articles, to retard loss of heat from the articles, and then gradually diminishing the temperature of the envelop by conveying the oven through the natural atmosphere to a delivery station for the articles.

4. The method of finishing glass articles, which method consists in heating the articles, then applying a finishing tool to the articles while still heated, then placing the articles while still heated and without reheating into a partially heated oven, then closing the oven to retain the heat therein, and then gradually diminishing the temperature by degrees uniformly in and around the articles by causing the oven with the articles and heat therein to be conveyed through the natural atmosphere, to cause radiation of the heat.

5. Apparatus for making glassware including a reheating furnace, a tooling station, a delivery station, a plurality of portable ovens having each a door to receive the glassware while heated and having also means for retarding heat radiation from the oven and the glassware, and guiding means for guiding the ovens from the tooling station to the delivery station.

6. Apparatus for making glassware including a furnace for heating the glassware, a plurality of ovens to receive and convey the glassware away from the furnace and having each a door in a side thereof, means for retarding radiation of heat from the ovens and the glassware therein, a guideway for the ovens, and means adjacent to the guideway for partially opening the ovens in their passage along the guideway.

7. Apparatus for making glassware including a furnace for reheating the glassware, means for tooling the reheated glassware, a delivery station for the finished glassware, a plurality of portable ovens to receive the heated glassware after having been tooled, and means for guiding the ovens from the place of tooling to the delivery station and return.

8. Apparatus for making glassware including a plurality of furnaces for reheating the glassware, a plurality of finisher's stations for tooling the reheated glassware, a delivery station remote from the finishers' stations, a plurality of portable ovens to receive the glassware while heated and retain the glassware and gradually diminishing degrees of heat therein, and mechanical means for guiding the ovens from the plurality of finishers' stations collectively to the delivery station and return.

9. Apparatus for making glassware including a portable oven having a door to receive the glassware, means for retarding heat radiation from the oven, a plurality of finishers' stations, a delivery station, guiding means for guiding the oven from either one of the finishers' stations to the delivery station in upright position, and means for moving the oven along the guiding means to the delivery station and return.

10. Apparatus for making glassware including a re-heating furnace, a plurality of portable ovens having each a door to receive the glassware, means for retarding heat radiation from the ovens, a delivery station remote from the furnace, continuous guiding means for guiding the plurality of ovens from the furnace to the delivery station and return, and means for moving the ovens along the guiding means.

11. Apparatus for making glassware including a plurality of re-heating furnaces, a plurality of finishers' stations, a delivery station, a plurality of ovens to receive and convey the glassware from the finishers' stations to the delivery station and provided each with a pair of trunnions, and means for supporting the trunnions to convey the ovens from a finishers' station to the delivery station and return.

12. Apparatus for making glassware including a furnace for re-heating the glassware, a finishers' station, a delivery station, a guideway between the finishers' station and the delivery station, a portable oven to receive the glassware at the finishers' station and guided by the guideway, means for admitting air into and out of the oven and provided with an operating-arm, a trip-arm fixed near the guideway to be engaged by the operating-arm, and means for moving the oven along the guideway.

13. Apparatus for making glassware including portable ovens having each a door in a side thereof to receive the glassware and having also a lid to permit removal of the glassware, each oven having a lining for retarding heat radiation from the oven and the glassware, a plurality of finishers' stations, a delivery station, guiding means for guiding the ovens from either one of the finishers' stations to the delivery station and return, and means for moving the ovens along the guiding means.

14. Apparatus for annealing glassware including a furnace for heating the glassware, a plurality of ovens to receive and convey the heated glassware away from the furnace and having each a door in a side thereof opening inward and also a relatively small door in the side opening outward, the doorway of the smaller door opening into the doorway of the other door, each oven having also a lid to permit of the removal of the glassware, and means for retarding radiation of heat from the ovens and the glassware therein.

In testimony whereof, I affix my signature in presence of two witnesses.

WILLIAM E. HOLMES.

Witnesses:
Wm. H. Payne,
E. T. Silvius.